United States Patent [19]

Gutierrez et al.

[11] Patent Number: 5,219,480
[45] Date of Patent: Jun. 15, 1993

[54] NOVEL ETHYLENE ALPHA-OLEFIN MANNICH BASE VISCOSITY INDEX IMPROVER/DISPERSANT ADDITIVES DERIVED FROM AMINO PHENOLS AND MONOSECONDARY AMINES

[75] Inventors: Antonio Gutierrez, Mercerville; Robert A. Kleist, Bayonne; Ricardo Bloch, Scotch Plains, all of N.J.

[73] Assignee: Exxon Chemical Patents Inc, Linden, N.J.

[21] Appl. No.: 226,611

[22] Filed: Aug. 1, 1988

[51] Int. Cl.⁵ .......................................... C10M 159/16
[52] U.S. Cl. ............................ 252/51.5 A; 252/51.5 R
[58] Field of Search ....................... 252/51.5 R, 51.5 A

[56] References Cited

U.S. PATENT DOCUMENTS

| | | | |
|---|---|---|---|
| 3,442,808 | 5/1969 | Traise et al. | 252/49.6 |
| 4,070,402 | 1/1978 | Karll et al. | 260/619 |
| 4,131,553 | 12/1978 | West | 252/33 |
| 4,137,185 | 1/1979 | Gardiner et al. | 252/33 |
| 4,144,181 | 3/1979 | Elliott et al. | 252/33 |
| 4,170,562 | 10/1979 | West | 252/51.5 |
| 4,354,950 | 10/1982 | Hammond et al. | 252/51.5 A |
| 4,455,244 | 6/1984 | Smyser et al. | 252/51.5 R |
| 4,517,104 | 5/1985 | Bloch et al. | 252/51.5 A |
| 4,693,838 | 9/1987 | Varma et al. | 252/51.5 R |
| 4,787,996 | 11/1988 | Horodysky et al. | 252/51.5 R |
| 4,808,325 | 2/1989 | Song et al. | 252/51.5 A |
| 4,820,432 | 4/1989 | Lundberg et al. | 252/51.5 A |
| 4,863,623 | 9/1989 | Nalesnik | 252/51.5 A |
| 4,877,834 | 10/1989 | Liu et al. | 252/51.5 R |

Primary Examiner—Jacqueline V. Howard
Attorney, Agent, or Firm—J. B. Murray; M. E. Alter

[57] ABSTRACT

The present invention is directed to oil-soluble lubricating oil viscosity index improver/dispersant additives comprising Mannich Base condensates of a grafted ethylene copolymer, an optionally alkyl-substituted N-hydroxyaryl compound, an aldehyde, and a monosecondary amine, whereby oil solutions, particularly oil concentrates, of said additives which are characterized by minimal viscosity change over an extended period of time. These additives comprise a copolymer of ethylene with one or more $C_3$ to $C_{28}$ alpha-olefins, preferably propylene, which have been grafted with acid moieties, e.g. maleic anhydride, preferably using a free radical initiator in a solvent such as a lubricating oil, which is then either (a) reacted with an N-hydroxyaryl amine and then condensed with an aldehyde and a monosecondary amine to form the Mannich Base viscosity index improver/dispersant material, or (b) reacted with a preformed Mannich Base condensate of an N-hydroxyaryl amine, aldehyde and the monosecondary amine. The invention also relates to process for preparing the preceding products and their use in oil compositions.

44 Claims, No Drawings

NOVEL ETHYLENE ALPHA-OLEFIN MANNICH BASE VISCOSITY INDEX IMPROVER/DISPERSANT ADDITIVES DERIVED FROM AMINO PHENOLS AND MONOSECONDARY AMINES

CROSS-REFERENCE TO RELATED APPLICATIONS

This application is related to copending application U.S. Ser. No. 226,767, entitled "Novel Ethylene Alpha-Olefin Polymer Substituted Amino Phenol Mannich Base Lubricant Dispersant Additives".

FIELD OF THE INVENTION

The invention relates to polymeric viscosity index (V.I.) improvers-dispersant additives for petroleum oils, particularly lubricating oils whereby oil solutions, particularly oil concentrates, of said additives which are characterized by minimal viscosity change over an extended period of time. These additives comprise a copolymer of ethylene with one or more $C_3$ to $C_{28}$ alpha-olefins, preferably propylene, which have been grafted with acid moieties, e.g. maleic anhydride, preferably using a free radical initiator in a solvent such as a lubricating oil, which is then either (a) reacted with an N-hydroxyaryl amine and then condensed with an aldehyde and a monosecondary amine to form the Mannich Base viscosity index improver/dispersant material, or (b) reacted with a preformed Mannich Base condensate of an N-hydroxyaryl amine, aldehyde and the monosecondary amine. The invention also relates to process for preparing the preceding products and their use in oil compositions.

BACKGROUND OF THE INVENTION

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polyamine.

U.S. Patent relates to dispersant- V.I. improver additives prepared by Mannich Base condensation of oxidized ethylene-propylene copolymer with formaldehyde and primary or secondary amines of the general formula: $H_2N(CH_2)_yNH_2(y=3$ to $10)$ and polyalkylene polyamines.

U.S. Pat. No. 4,170,562 relates to modified Mannich reaction products produced by reacting an oxidized ethylene-propylene copolymer with formaldehyde and primary or secondary amines of the general formula: $H_2N(CH_2)_yNH_2(y=3$ to $10)$ and polyalkylene polyamines in the presence of 0.01 to 25 wt % of an oil-soluble phenol of the formula:

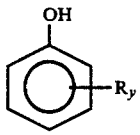

where R is alkyl of OH, Cl, or Br substituted hydrocarbyl, and $y=1$ to 5.

U.S. Pat. No. 4,131,553 relates to dispersant/viscosity index improvers prepared by a Mannich Base condensation of an an oxidized ethylene-propylene copolymer with formaldehyde and primary or secondary amines of the general formula: $H_2N(CH_2)_yNH_2$ ($y=3$ to $10$) and polyalkylene polyamines in the presence of an oil-soluble sulfonic acid as catalyst for the reaction. The sulfonic acids have the general formula:

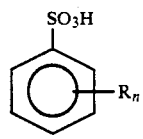

where R is alkyl or OH, Cl, or Br substituted hydrocarbyl, and $n=1$ to 5. The patent teaches that the sulfonic acid must be added to the oxidized ethylene-propylene copolymer after addition of the amine to avoid rapid decomposition of the acid and darkening of the oil.

U.S. Pat. No. 4,070,402 relates to phenols which are alkylated with high molecular weight ethylene-propylene-diene terpolymers. The alkylated phenols can be converted into ashless dispersants by the Mannich Base reaction with formaldehyde and a polyamine, Bis-aminopropyl piperizine (a diprimary amine) is the only polyamine specified.

U.S. Pat. No. 4,354,950 discloses a method of preparing Mannich base derivatives of hydroxyaryl succinimides of the formula:

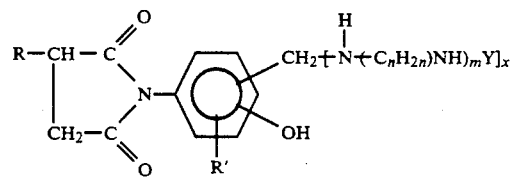

wherein R is hydrocarbyl of 25 to 200 carbon atoms, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hydroxyaryl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine and an aldehyde (e.g., formaldehyde) in a Mannich base reaction to produce the described succinimides. The described succinimides may be added to a base oil of lubricating viscosity to form lubricant concentrates and lubricating oil formulations.

U.S. Pat. No. 4,517,104, incorporated herein by reference, discloses polymeric viscosity index (V.I.) improver-dispersant additives for petroleum oils, particularly lubricating oils, comprising a copolymer of ethylene with one or more $C_3$ to $C_{28}$ alpha-olefins, preferably propylene, which have been grafted with acid moieties, e.g. maleic anhydride, preferably using a free radical initiator in a solvent, preferably lubricating oil, and then reacted with a mixture of a carboxylic acid component, preferably an alkyl succinic anhydride, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

While these additives are very useful oil compositions, particularly concentrates, thereof tend to exhibit increased viscosity over an extended period of time. Therefore, there exists a need for additives whose oil solutions, particularly oil concentrates, exhibit less viscosity change over an extended period of time.

The source of the viscosity increase over an extended period of time of oil solutions of these additives appears to be, at least in part, due to the chain extension of the polymer. Several solutions to this problem are described in the prior art. One solution is to use the polyamines and then to react the remaining unreacted primary amino groups with acid anhydrides of either $C_1$-$C_{30}$ monocarboxylic acid, preferably acetic anhydride, or unsubstituted or $C_1$ to $C_8$ hydrocarbyl substituted dicarboxylic acid anhydrides of U.S. Pat. No. 4,137,185; or the sulfonic acids of U.S. Pat. No. 4,144,181. These materials act as polyamine group end-capping or inactivating agents to inhibit or limit chain extension. That is to say, the reaction product of the graft copolymer of the ethylenically unsaturated dicarboxylic acid material and polyamine is post-treated with these acid materials to inhibit chain extension and viscosity increase of the imide grafted ethylene copolymer.

While the end-capping or amine inactivating agents disclosed in U.S. Pat. Nos. 4,137,185 and 4,144,181 are generally quite useful, their utilization results in some problems under certain conditions. Thus, for example, reacting a monocarboxylic acid anhydride, e.g., acetic anhydride, with the polyamine yields an acid by-product, e.g., acetic acid. This acid is deleterious to engine operation, causing corrosion, and generally needs to be removed from the oil solution of the V.I. improver-dispersant. Furthermore, the use of the unsubstituted or lower hydrocarbyl substituted dicarboxylic acid anhydrides of U.S. Pat. No. 4,137,185 generally does not remedy, and may sometimes even contribute to, the formation of haze in oil solutions of the imide grafted ethylene copolymer. This is due to the fact that when using free radical initiators with mineral oil as the grafting medium a proportion of the oil molecules in turn become grafted with the ethylenically unsaturated moiety, e.g., maleic anhydride, and upon subsequent reaction with the amine these grafted oil particles tend to become insoluble and to form haze. Upon the addition of the hydrocarbyl substituted dicarboxylic acid anhydrides to this oil solution to inactivate the unreacted primary amine groups of the imide grafted ethylene copolymer, a certain proportion of the anhydride reacts with the free amine groups of the grafted oil particles. Since the prior art anhydrides are either unsubstituted or lower hydrocarbyl substituted they do not facilitate the solubilization of these insoluble grafted oil particles.

The use of the sulfonic acids of U.S. Pat. No. 4,144,181 may also result in the formation of undesirable acid by-products, e.g., hydrogen sulfide.

Furthermore, these prior art end-capping or primary amine inactivating agents do not, in all instances, provide a sufficient degree of viscosity stability for some applications to oil solutions of the additives of this invention.

SUMMARY OF THE INVENTION

The present invention is directed to oil soluble additives, particularly viscosity index improver-dispersant additives, for oleaginous materials whereby oil solutions thereof, particularly oil concentrates, exhibit improved viscosity stability over an extended period of time.

In accordance with one aspect of the present invention, there are provided novel oil-soluble, viscosity index improver-dispersant additives of ethylene copolymers, such as copolymers of ethylene and propylene; and ethylene, propylene and diolefin; etc, formed by reacting or grafting the ethylene copolymers with ethylenically unsaturated carboxylic acid moieties, preferably maleic anhydride moieties, and then contacting the grafted ethylene copolymer contacting under reaction conditions with (A) at least one N-hydroxyaryl amine, which can be optionally alky-substituted, (B) at least one aldehyde reactant, and (E) at least one monosecondary amine, to form a Mannich Base condensate V.I. improver/dispersant material, whereby oil solutions of said additives are characterized by improved viscosity stability over an extended period of time.

In accordance with other aspects of the present invention, an oil-soluble lubricating oil additive is provided by a process which comprises (a) forming a Mannich Base condensate intermediate by reacting (A) an optionally alkyl-substituted N-hydroxyaryl amine with (B) at least one aldehyde reactant (e.g., formaldehyde) and (C) a monosecondary amine, and thereafter (b) contacting the Mannich Base intermediate with (A) at least one ethylene copolymer containing grafted carboxylic acid groups, to form a Mannich Base condensate V.I. improver/dispersant material.

In accordance with yet other aspects of the present invention, an oil-soluble lubricating oil additive is provided by a process which comprises (a) contacting at least one ethylene copolymer containing grafted carboxylic acid groups, with (A) an optionally alkyl-substituted N-hydroxyaryl amine to form a polymer-substituted carbonyl-amino aromatic material, and (b) contacting said polymer-substituted carbonyl-amino aromatic material with (B) at least one aldehyde reactant (e.g., formaldehyde) and (C) a monosecondary amine, to form the desired Mannich Base condensate dispersant material.

The Mannich Base viscosity index improvers/dispersant materials thereby obtained yield oil solutions, particularly concentrates, thereof which are characterized by improved viscosity stability over prolonged periods of time.

DETAILED DESCRIPTION OF THE INVENTION

Ethylene Copolymer

Oil soluble ethylene copolymers used in the invention generally will have a number-average molecular weight ($M_n$) of from greater than about 10,000 to about 500,000; preferably about 15,000 to 250,000 and optimally from about 20,000 to 100,000. In general, polymers useful as V.I. improvers will be used. These V.I. improvers will generally have a narrow range of molecular weight, as determined by the ratio of weight-average molecular weight ($M_w$) to number-average molecular weight ($M_n$). Polymers having a $M_w/M_n$ of less than 10, preferably less than 7, and more preferably 4 or less are most desirable. As used herein ($M_n$) and ($M_w$) are measured by the well known techniques of vapor phase osmometry (VPO), membrane osmometry and gel permeation chromotography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more C3 to C28, preferably C3 to C18, more preferably C3 to C8, alpha olefins. While not essential, such copolymers preferably have a degree of crystallinity of less than 25 wt. %, as determined by X-ray diffraction and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes ethylene-alpha-olefin interpolymers, including terpolymers, tetrapolymers, etc., of ethylene, said C3-28 alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.
b. Branched chain acyclic dienes such as: 5-methyl-1,4-hexadiene; 3,7-dimethyl 1,6octadiene; 3,7-dimethyl 1,7-octadiene; and the mixed isomers of dihydro-myrcene and dihydro-cymene.
c. Single ring alicyclic dienes such as: 1,4-cyclohexadiene; 1,5-cyclooctadiene; 1,5-cyclododecadiene; 4-vinylcyclohexene; 1-allyl-4-isopropylidene cyclohexane; 3-allyl-cyclopentene; 4-allyl-cyclohexene and 1-isopropenyl-4-(4-butenyl) cyclohexane.
d. Multi-single ring alicyclic dienes such as: 4,4'-dicyclopentenyl and 4,4,-dicyclohexenyl dienes.
e. Multi-ring alicyclic fused and bridged ring dienes such as: tetrahydroindene; methyl tetrahydroindene; dicyclopentadiene; bicyclo (2.2.1) hepta-2,5-diene; alkyl, alkenyl, alkylidene, cycloalkenyl and cycloalkylidene norbornenes such as: ethyl norbornene; 5-methylene-6-methyl-2-norbornene; 5-methylene-6,6-dimethyl-2-norbornene; 5-propenyl-2-norbornene; 5-(3-cyclopentenyl)2-norbornene and 5-cyclohexylidene-2-norbornene; norbornadiene; etc.

Ethylenically Unsaturated Carboxylic Acid Material

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciably but grafts onto the ethylene copolymer to give two carboxylic acid functionalities. Such preferred materials have the generic formula (I):

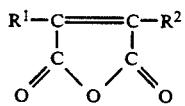

wherein $R^1$ and $R^2$ are hydrogen or a halogen. Suitable examples additionally include chloro-maleic anhydride, itaconic anhydride, or the corresponding dicarboxylic acids, such as maleic acid or fumaric acid or their monoesters, etc.

Ethylene copolymers grafted with an ethylenically unsaturated carboxylic acid can be prepared by any technique, such as the methods disclosed in U.S. Pat. Nos. 4,517,104 and 4,632,769, both of which are incorporated herein by reference. As taught by U.S. Pat. Nos. 4,160,739 and 4,161,452 various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component.

Typically, such comonomers do not contain free carboxylic acid groups and are esters containing alpha-ethylenic unsaturation in the acid or alcohol portion; hydrocarbons, both aliphatic and aromatic, containing alpha-ethylenic unsaturation, such as the $C_4$-$C_{12}$ alpha olefins, for example hexene, nonene, dodecene, etc.; styrenes, for example styrene, alpha-methyl styrene, p-methyl styrene, butyl styrene, etc.; and vinyl monomers, for example vinyl acetate, vinyl chloride, vinyl ketones such as methyl and ethyl vinyl ketone, and nitrogen containing vinyl monomer such as vinyl pyridine and vinyl pyrollidine, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component (that is, the total weight of the ethylene, alpa-olefin and diene monomers charged) of about 1:4 to 4:1, preferably about 12 to 2:1 by weight.

Grafting of the Ethylene Copolymer

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amine material (that is either the N-hydroxyaryl amine reactant or the Mannich Base condensate formed by condensing the N-hydroxyaryl amine reactant with aldehyde and monosecondary amine) and as a solvent for the end product to form the lubricating additive concentrate. The oil having attached, grafted carboxyl groups, when reacted with the amine material will also be converted to the corresponding derivatives.

THE N-HYDROXYARYL AMINE MATERIAL

The N-hydroxyaryl amines employed in this invention can comprise any aromatic compound having at least one hydroxy group and at least one amine-containing group substituted on at least one ring of the aromatic compound. The N-hydroxyaryl amines which are preferred in this invention comprise N-hydroxyaryl mono-primary amines of the formula (II):

wherein Ar represents

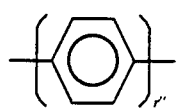

or

and wherein r" is 1 or 2, and alkyl- and halide-substituted derivatives thereof, wherein from 1 to 3 ring carbon atoms are substituted by a hydrocarbyl group or halide atom. Illustrative of such Ar groups are phenylene,

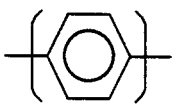

biphenylene,

naphthylene,

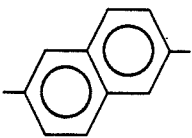

and the like. The Ar group may be substituted with to 3, preferably 1 to 2, hydrocarbyl groups, e.g., alkyl groups containing 1 to 20 carbon atoms, or with 1 to 3 halogen radicals, e.g., chloro-, bromo-, or iodo-.

Preferred N-hydroxyaryl amine reactants are amino phenols of the formula (III):

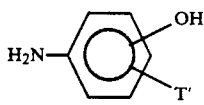

in which ' is hydrogen, an alkyl radical having from 1 to 3 carbon atoms or a halogen radical such as the chloride or bromide radical.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

Suitable amino-substituted polyhydroxyaryls are the aminocatechols, the amino resorcinols, and the aminohydroquinones, e.g., 4-amino-1,2- dihydroxybenzene, 3-amino-1,2-dihydroxybenzene, 5-amino-1,3-dihydroxybenzene, 4 - amino- 1,3-dihydroxybenzene, 2-amino-1,4-dihydroxybenzene, 3-amino-1,4-dihydroxybenzene and the like.

Suitable aminonaphthols include 1-amino-5-hydroxynaphthalene, 1-amino-3-hydroxynaphthalene and the like.

MONOSECONDARY AMINE COMPOUNDS

Amine compounds useful as reactant (C) in the present invention comprise monosecondary amines, which contain one secondary amine group and should contain no primary amine groups. The monosecondary amines will generally comprise from about 2 to 60, preferably 2 to 40 (e.g. 3 to 20), total carbon atoms. The monosecondary amines can also contain one or more tertiary amine groups, e.g., about 1 to 12, preferably 1 to 3, and most preferably tertiary nitrogen groups in the molecule. These monosecondary amines may be hydrocarbyl amines or may be hydrocarbyl amines including other groups, e.g, hydroxy groups, alkoxy groups, tertiary amide groups, ether oxygen groups, thioether sulfur groups, nitriles, imidazoline groups, and the like. Hydroxy amines with 1 to 6 hydroxy groups, preferably 1 to 3 hydroxy groups, are particularly useful.

The mono-secondary amine containing compounds of the present invention can broadly be represented by the formula (IV):

where R and R' are the same of different and are alkyl, cycloalkyl, aryl, alkaryl, aralkyl and hydrocarby substituted derivatives thereof, e.g., alkyl substituted cycloalkyl. Furthermore, the R and R' groups can contain carbon substitution by one or more tertiary amine groups therein, can contain one or more heteroatoms (for example oxygen, nitrogen, sulfur, etc.), and can further contain sulfide or oxy linkages therein. Generally R and R' contain from to 50 carbon atoms, e.g., an alkyl containing from 1 to 50 carbon atoms, a cycloalkyl containing from 5 to about 12 ring carbon atoms, and an aromatic radical such as aryl, aralkyl or alkaryl containing from 6 to about 12 ring carbon atoms.

Preferred secondary amine containing compounds are those that, in addition to the single secondary amine group, contain at least one tertiary amine group and should contain no primary or additional secondary amine groups, i.e., R and R' contain at least one tertiary amine group.

These types of amines are known materials which can be prepared by conventional means, such as the methods disclosed in U.S. Pat. Nos. 3,239,658; 3,449,250 and 4,171,273, all of which are incorporated herein by reference.

These monosecondary amines include those represented by the general formulae:

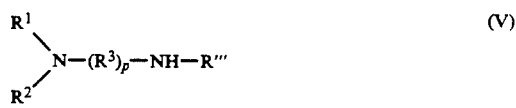

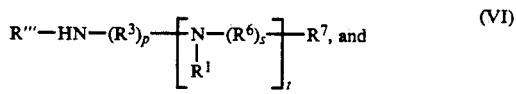

wherein:

p is zero or one;

s is zero or one;

t is 1 to about 10;

$R^1$ and $R'''$ are independently selected from alkyl radicals, either straight chain or branched, containing from to about 6 carbon atoms and cycloalkyl radicals containing from 4 to about 8 ring carbon atoms;

$R^3$ and $R^6$ are independently selected from unsubstituted or $C_1-C_6$ alkyl substituted alkylene radicals having from 1 to about 6 carbon atoms;

$R_4$ and $R_5$ are independently selected from unsubstituted, $C_1-C_6$ alkyl substituted, or Y substituted alkylene radicals containing from 1 to about 6 carbon atoms, or from unsubstituted, $C_1-C_6$ alkyl substituted, or Y substituted alkenylene radicals containing from 2 to about 6 carbon atoms;

$R^7$ is hydrogen, alkyl radical containing from 1 to about 6 carbons,

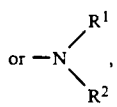

with the proviso that if s is zero then $R^7$ is not hydrogen;

$X^1$ and $X^2$ are independently selected from —O—, —S—, —N($R^1$)—, —$R^3$, —N(Y)—, or —CH(Y)— radicals; and Y is —NHR' or—$R^3$ —NHR';

with the provisos that the identities of groups $X^1$, $X^2$, $R^4$ and $R^5$ are selected to provide only one secondary amine group (i.e., the molecule of structural formula VII contains one and only one Y group) and, preferably, at least one tertiary amine per molecule of structural Formula VII.

In compounds of Formula VII it is generally preferred that $R^4$ and $R^5$ are alkylene rather than alkenylene radicals.

It is to be understood that only one monosecondary amine compound can be reacted with the grafted ethylene copolymer or a mixture of two or more different monosecondary amine compounds can be utilized.

Further examples of monosecondary amines are aliphatic and cycloaliphatic saturated amines of the general formulas:

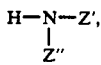

and

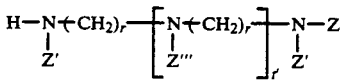

wherein Z, Z', Z" and Z''' are independently selected from the group consisting of $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein Z''' can additionally comprise a moiety of the formula:

wherein Z' is as defined above, and wherein r and r' can be the same or a different number of from 2 to 6, preferably 2 to 4; and t' and t" can be the same or different and are numbers of from 0 to 10, preferably 2 to 7, and most preferably about 3 to 7, with the proviso that the sum of t' and t" is not greater than 15. The most preferred amine of the above formulas are represented by Formula IX wherein each Z and Z' each comprise $C_1$ to $C_{25}$ hydroxy-substituted alkyl groups.

Other useful amine compounds include: secondary alicyclic diamines such as 1-hydroxymethyl-4-methylaminomethyl cyclohexane, and heterocyclic nitrogen compounds such as N-hydrocarbyl substituted N-aminoalkyl piperazines of the general formula (XI):

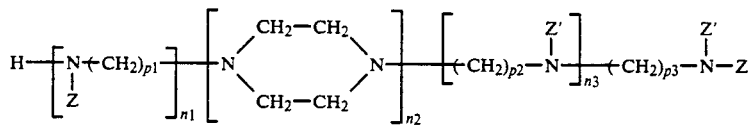

wherein Z and Z' are as defined above, $p_1$, $p_2$ and $p_3$ are the same or different and are each integers of from 1 to 4, and $n_1$, $n_2$ and $n_3$ are the same or different and are each integers of from 1 to 3.

Useful amines also include polyoxyalkylene polyamines such as those of the formula (XII):

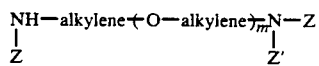

where Z and Z' are as defined above and m has a value of about 3 to 70 and preferably 10 to 35. The alkylene groups in formula (XII) may be straight or branched chains containing about 2 to 7, and preferably about 2 to 4 carbon atoms.

The polyoxyalkylene polyamines of formula (XII) above, preferably N-alkyl substituted polyoxyalkylene diamines and N-alkyl substituted polyoxyalkylene triamines, may have average molecular weights ranging from about 200 to about 4000 and preferably from about 400 to about 2000. The preferred N-alkyl substituted polyoxyalkylene polyamines include the N-alkyl substituted polyoxyethylene and N-alkyl substituted polyoxypropylene diamines and the N-alkyl substituted polyoxypropylene triamines having average molecular weights ranging from about 200 to 2000.

Some illustrative non-limiting examples of the monosecondary amine containing compounds include:

N,N-dimethyl-N'-methyl-1,2-ethylenediamine;
N-methyl-N-ethyl-N'-methyl-1,2-propylenediamine;
N,N-dimethyl-N'-ethyl-1,3-propylenediamine;
N,N-diethyl-N'-methyl-1,3-propylenediamine;
N,N-dipropyl-N'-ethyl-1,3-propylenediamine;
N,N-diisopropyl-N'-methyl-1,3-propylenediamine;
N,N-dibutyl-N'-methyl-1,3-propylenediamine;
N,N-diisobutyl-N'-isobutyl-1,3-propylenediamine;
N,N-(di-t-butyl)-N'-methyl-1,3-propylenediamine;
N,N-dimethyl-N'-ethyl-1,3-propylenediamine;

N,N-dimethyl-N'-butyl-1,3-propylenediamine;
N,N-dimethyl-N'-methyl-1,2-isopropylenediamine;
N,N-dimethyl-N'-methyl-1,4-butylenediamine;
N,N-diethyl-N'-methyl-2,3-butylenediamine;
N,N-dimethyl-N'-propyl-1,3-isobutylenediamine;
N,N-dimethyl-N'-methyl-1,3-butylenediamine;
N,N-dimethyl-N'-hexyl-1,3-t-butylenediamine;
N,N-dicyclohexyl-N'-methyl-1,3-propylenediamine;
N,N-dicyclohexyl-N'-methyl-1,2-ethylenediamine;
2-(methylamino)pyridine; (ethylamino)pyrazine;
N-(3-methylaminopropyl) morpholine; N-(propyl) imidazolidine; pyrrolidine; N,N-dimethyl-N'-ethylhydrazine; dimethylamine; diethylamine; dibutylamine;
N-methyl-N(2-methyoxyethyl) amine;
N-alkyl-N-(3-alkoxypropyl) amines wherein the alkoxy group contains from 1 to 18 carbon atoms, usually an alkoxy group having from 1 to 8 carbon atoms and has the formula R—O—CH$_2$CH$_2$C—H$_2$—NH—R', wherein R and R' are alkyl, such as N-methyl-N(3-methoxypropyl) amine and N-methyl-N(3-isobutyoxypropyl) amine;
N-alkyl-N-(3-alkoxypolyethoxy)propyl amines having the formula RO(CH$_2$C—H$_2$O)$_x$CH$_2$CH$_2$CH$_2$N-H—R' wherein R and R' are alkyl, and wherein the alkoxy group is as immediately set forth above and where x is to 50;
N-(3-methylaminopropyl)-N'-methylpiperazine;
N-(ethyl)piperazine;
(N-methylamino)-pyridines;
2-(methylaminomethyl)furan;
3-propylamino-2-oxotetrahydrofuran;
N-hexylaminomethypyrrolidine;
N-aminomethyl-1-methyl-pyrrolidine;
N-heptylaminopyrrolidine, morpholine;
N,N-dimethyl-1,3-diaminopropane;
N,N-di-(2-hydroxybutyl) ethylene diamine;
N,N-di(2-hydroxyethyl)-N-methyl-1,3-propylene diamine;
3-dodecyloxypropylamine; N-dodecyl-N-methyl-1,3-propane diamine; diisopropanol amine; diethanol amine; triethanol amine; N'-alkyl amino morpholines such as N-(N'-3-methylaminopropyl)morpholine; and the like, and mixtures thereof.

THE ALDEHYDE MATERIAL

The aldehyde reactants will generally comprise formaldehyde or paraformaldehyde, although it will be understood that other aldehyde-group containing compounds, such as C$_2$ to C$_{10}$ hydrocarbyl aldehydes (e.g., butyraldehyde, acetaldehyde, propionaldehyde, and the like) can also be employed. A preferred group of aldehyde materials are compounds of the formula: R"CHO, wherein R" is H or aliphatic hydrocarbon radical having from 1 to 4 carbon atoms.

Reaction of Grafted Ethylene Copolymer with N-hydroxyaryl Amine and Monosecondary Amine Component The grafted polymer, preferably in solution generally equal to about 5 to 30 wt. %, preferably 10 to 20 wt. % polymer, can be readily reacted with the N-hydroxyaryl amine, or with the pre-reacted N-hydroxyaryl amine/aldehyde/monosecondary amine Mannich Base intermediate material (the preparation of which will be more completely described below), by admixture together with said grafted polymer and heating at a temperature of from about 100° C. to 250° C., preferably from 150° to 200° C., for from about 0.1 to 10 hours, usually about 0.1 to about 2 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water assures completion of the imidation reaction. Reaction ratios can vary considerably, depending upon the reactants, amounts of excess, type of bonds formed, etc. Generally from about 1 to 2 molar equivalents, preferably about 1 molar equivalents, of said N-hydroxyaryl amine is preferably used, per mole of the grafted dicarboxylic acid moiety content, e.g. grafted maleic anhydride content. Alternatively, if pre-reacted N-hydroxyaryl amine/aldehyde/monosecondary amine Mannich Base intermediate material is used, sufficient to give about 1 to 2 molar equivalents of primary amine groups in the pre-reacted N-hydroxyaryl amine/aldehyde/monosecondary amine Mannich Base intermediate material per dicarboxylic acid moiety in the grafted polymer, depending on whether primarily imides or amides are formed. For example, with an ethylene-propylene copolymer of about 40,000 (M$_n$), i.e. a thickening efficiency of about 2.1, and averaging 4 maleic anhydride groups per molecule, and making imides, about 4 moles of N-hydroxyaryl amine with one primary group would preferably be used per mole of grafted ethylene copolymer.

In one preferred aspect of this invention, the novel dispersants of this invention are prepared by reacting the grafted ethylene copolymer with the N-hydroxyaryl amine material to form a carbonyl-amino material containing at least one group having a carbonyl group bonded to a secondary or a tertiary nitrogen atom. In the amide form, the carbonyl-amino material can contain 1 or 2 —C(O)—NH— groups, and in the imide form the carbonyl-amino material will contain —C(O)—N—C(O)— groups. The carbonyl-amino material can therefore comprise N-(hydroxyaryl) polymer-substituted dicarboxylic acid diamide, N-(hydroxyaryl) polymer-substituted dicarboxylic acid imide, N-(hydroxyaryl) polymer substituted-monocarboxylic acid monoamide, N-(hydroxyaryl) polymer-substituted dicarboxylic acid monoamide or a mixture thereof.

In general, equimolar amounts of the grafted ethylene copolymer (such as ethylene-propylene copolymer substituted with succinic anhydride groups), and of the N-hydroxyaryl amine (such as p-aminophenol), are dissolved in an inert solvent (i.e., a hydrocarbon solvent such as toluene, xylene, or isooctane) and reacted at a moderately elevated temperature up to the reflux temperature of the solvent used, for sufficient time to complete the formation of the intermediate N-(hydroxyaryl) hydrocarbyl amide or imide. Thereafter, the solvent is removed under vacuum at an elevated temperature, generally, at approximately 160° C. (1 mm).

Alternatively, the intermediate is prepared by combining equimolar amounts of the grafted ethylene copolymer and the N-(hydroxyaryl) amine and heating the resulting mixture at elevated temperature under a nitrogen purge in the absence of solvent.

The resulting N-(hydroxyaryl) polymer substituted imides can be illustrated by the succinimides of the formula (XIII):

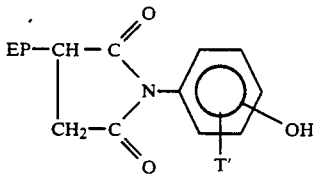

wherein T' is as defined above, and wherein EP represents the polymer substituent group derived from the ethylene copolymer (e.g., ethylene-propylene copolymer).

In the second step of this preferred aspect of the invention, the carbonyl-amino intermediate is reacted with at least one secondary amine (such as a morpholine and diethanol amine), together with an aldehyde (e.g., formaldehyde) in the Mannich base reaction. In general, the reactants are admixed and reacted at an elevated temperature until the reaction is complete. This reaction may be conducted in the presence of a solvent and in the presence of a quantity of mineral oil which is an effective solvent for the carbonyl-amino intermediate and for the finished Mannich base dispersant material. This second step can be illustrated by the Mannich base reaction between the above N-(hydroxyphenyl) polymer succinimide intermediate, paraformaldehyde and diethanol amine in accordance with the following equation:

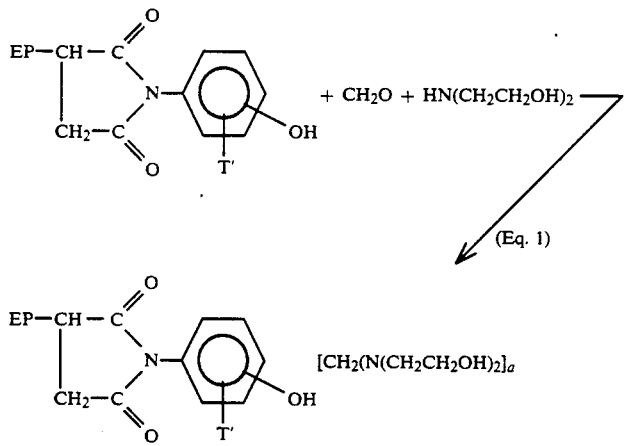

wherein a is an integer of 1 or 2, and EP and T' are as defined above.

In still other aspects of the invention, the order of reacting the various reactants is modified such that, for example, the N-hydroxyaryl amine is first admixed and reacted with the monosecondary amine material and aldehyde in the Mannich base reaction to form an N-hydroxy(aminomethylene) aryl amine material, which can then be reacted with the grafted ethylene copolymer substituted dicarboxylic acid material to form the desired V.I. improver/dispersant. The sequence of reactions performed in accordance with this aspect of the invention tends to result in the formation of various isomers because of the plurality of aromatic materials formed in the first Mannich base condensation step.

The Mannich base intermediate adduct formed by the reaction of the N-hydroxyaryl amine with the monosecondary amine reactant and aldehyde will contain at least one primary amine group (—$NH_2$) and at least one moiety of the formula (XIV):

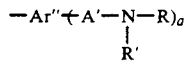

wherein a, R and R' are as defined above, A, comprises the group —CH(T")— wherein T" is H or alkyl of from 1 to 9 carbon atoms and is derived from the corresponding aldehyde reactant, and Ar" comprises the moiety of the formula (XV):

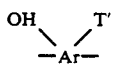

wherein T' and Ar are as defined above for the N-hydroxyaryl amines employed in this invention.

When the aldehyde used is formaldehyde, or an aldehyde which generates formaldehyde in the reaction mixture, the A' groups comprises —$CH_2$—, and the moieties of formula XIV are referred to herein as tertiaryaminomethyl-substituted hydroxy aryl groups.

Illustrative Mannich base intermediate adducts formed by the reaction of the N-hydroxyaryl amine with the monosecondary amine reactant and aldehyde are those of the formula (XVI):

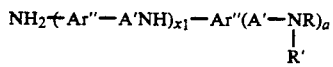

wherein A', Ar". R, R' and "a" are as defined above, and wherein $x_1$ is an integer of from 0 to 5, preferably 0 or 2, and most preferably 0.

Preferred adducts of formula XVI above are those wherein $x_1$ is 0 and "a" is 1 or 2 and most preferably wherein T' is H or alkyl of 1 to 3 carbon atoms and Ar is phenylene.

Illustrative adducts of structure XVI are set forth in Table I below:

TABLE I

| $x_1$ | a | Ar' | A' | A |
|---|---|---|---|---|
| 0 | 2 | —φ(OH)— | —$CH_2$— | —N($CH_3$)N($CH_3$)$_2$ |
| 0 | 2 | " | " | —N($CH_2CH_2OH$)$_2$ |
| 0 | 1 | " | " | —N($CH_2CH_2CH_2OH$)$_2$ |

TABLE I-continued

| $x_1$ | a | Ar' | A' | A |
|---|---|---|---|---|
| 0 | 1 | " | " | $-NCH_2CH_2OCH_2CH_2$ |
| 0 | 1 | " | " | $-N(C_2H_4OH)(C_3H_6OH)$ |
| 0 | 1 | " | " | $-N(C_4H_8OH)_2$ |
| 1 | 2 | " | $-CH(CH_3)-$ | $-N(C_5H_{10}OH)_2$ |
| 1 | 1 | " | " | $-N(CH_2CH_2OH)_2$ |
| 1 | 3 | " | " | $-N(CH_2CH_2CH_2OH)_2$ |
| 1 | 1 | " | " | $-NCH_2CH_2OCH_2CH_2$ |
| 1 | 1 | " | " | $-N(C_2H_4OH)(C_3H_6OH)$ |
| 0 | 2 | " | " | $-N(C_4H_8OH)_2$ |

For the sake of illustration, this aspect of the invention may be represented by the following equations:

(a) Monosecondary amine = diethanol amine

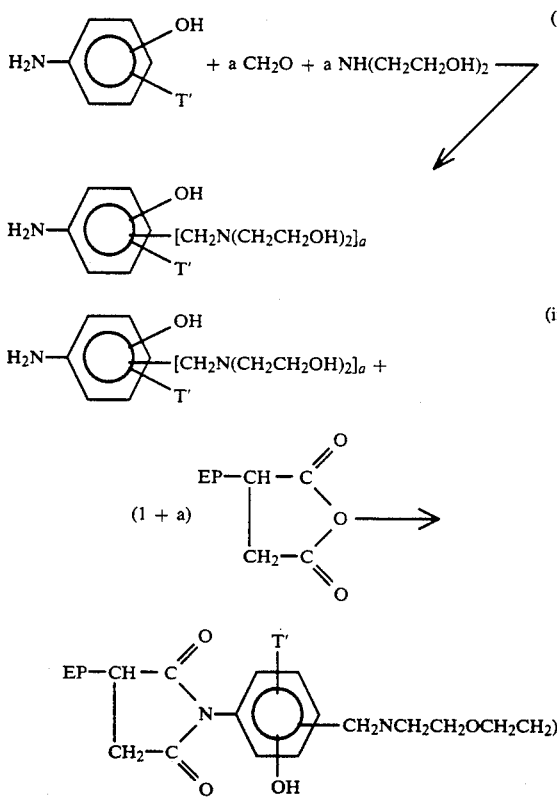

(b) Monosecondary amine = morpholine

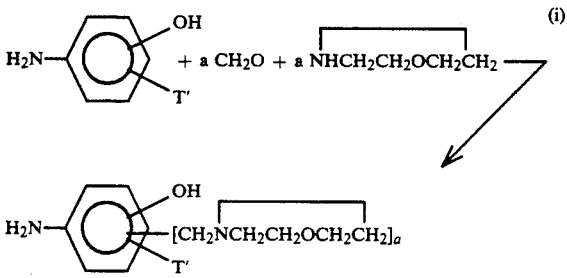

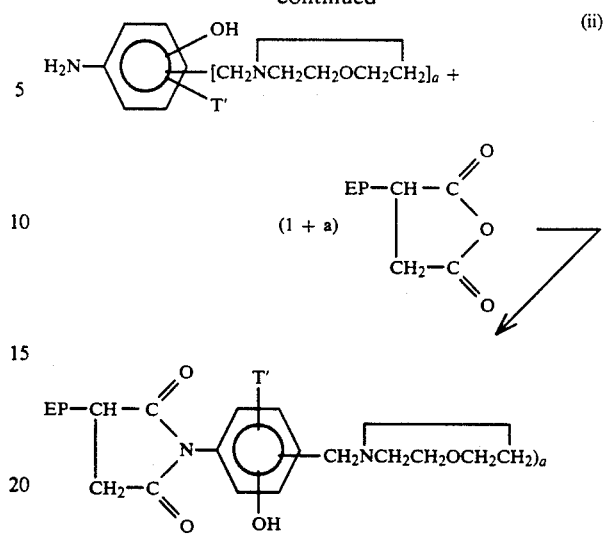

In one preferred embodiment of the invention, a grafted ethylene-propylene copolymer, which has been prepared by first grafting succinic anhydride moieties onto an ethylene-propylene copolymer using maleic anhydride, is reacted with an aminophenol to form an intermediate succinimide product, which is then reacted with formaldehyde and a monosecondary amine in the Mannich base reaction as outlined above to form the improved V.I. improver/dispersants of this invention. In another preferred embodiment of this invention, an aminophenol is first racted with formaldehyde and monosecondary amine in the Mannich Base reaction as outlined above to form an intermediate material containing at least one primary amine group and from one to three (tertiary amino)methyl-substituted hydroxy aryl groups per molecule, followed by reacting this intermediate with a grafted ethylene-propylene copolymer which has been grafted with maleic anhydride, to form the improved Mannich Base V.I. improver/dispersant additives of this invention.

The reactions of grafted ethylene copolymer with the N-hydroxyaryl amine materials (before or after reaction of these materials in the Mannich Base condensation reaction as outlined above) is preferably carried out in the substantial absence of oxygen, e.g., under an inert atmosphere such as under a nitrogen blanket.

A minor amount, e.g. 0.01 up to 50 wt %, preferably 0.05 to 25 wt. %, based on the weight of the total composition, of the V.I. improver-dispersants produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, derivatized copolymer concentrations are usually within the range of about 0.01 to 10 wt %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The derivatized polymers of the invention may be utilized in a concentrate form, e.g., from about 5 wt % up to about 50 wt. %, preferably 7 to 25 wt. %, in oil, e.g., mineral lubricating oil, for ease of handling, and may be prepared in this form by carrying out the reaction of the invention in oil as previously discussed.

The above oil compositions may optionally contain other conventional additives, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oilsoluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of Mn of 700 to 5,000) derived from polyalkylene-polyamines, which have at least one free carboxylic acid group, with (b) a reactive metal compound. Suitable rective metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobisalkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal sales, such as highly basic alkaline earth metal sulfonates (especially Ca and Mg salts) are frequently used as detergents.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

TABLE

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | 0.01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant.

Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

The following examples, which include preferred embodiments and wherein all parts are by weight unless otherwise indicated, further illustrate the present invention.

As mentioned hereinabove, the Mannich Base V.I. improver/dispersants of the present invention are particularly useful as fuel and lubricating oil additives. The Mannich Base V.I. improver/dispersants of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The present invention can be further illustrated by reference to the following Examples wherein parts are by weight unless otherwise indicated.

EXAMPLE 1

A mixture containing 0.1 equivalent of an ethylene propylene copolymer substituted succinic anhydride (EPSA) (thickening efficiency (TE)=1.4, grafted in S150N oil, 0.1 meq/g of a 20 wt. % S150N oil soln), 0.1 equivalent of 4-aminophenol and enough S150 oil to make a final product about 9% in S150N oil were stirred at 180° C. while passing through a mild stream of nitrogen gas. The reaction mixture was kept at 180° C. for about 4 hours and then stripped with nitrogen. It analyzed for 0.065 wt. % N.

EXAMPLE 2

About 0.1 equivalent of EPSA (TE=2.6, 0.2 meq/g, 19 wt. % in S150 oil, masticator grafted) was mixed with 0.1 equivalent of 4-amino-phenol, S150 oil to make a final product at 9 wt. % polymer concentration was heated to 180° C. for about 4 hours, while under nitrogen blanket. The reaction mixture was nitrogen stripped and collected for subsequent reactions. It analyzed for 0.0166 wt % N.

EXAMPLE 3

About 150 g of the stripped EPSA reaction mixture of Example 1 was mixed with 0.15 g of morpholine and 0.43 g of p-formaldehyde. The reaction mixture was heated to 80° C. while stirring and nitrogen stripping for one hour. At the end of the hour, the temperature was raised to 110° C., and the reaction mixture was nitrogen stripped for ½ hour. The product mixture analyzed for 0.22 wt. % N.

EXAMPLE 4

About 200 g of the stripped EPSA reaction mixture of Example 2 was mixed with 0.3 g of morpholine and 0.1 g p-formaldehyde. The mixture was then heated to 80° C. while stirring under nitrogen blanket for 1 hour. The temperature was then raised to 110° C. and the reaction mixture was nitrogen stripped for ½ hour. The product mixture analyzed for 0.41 wt. % N. The Mannich Base viscosity index improver/dispersant material was therefore formed employing and EPSA: aminophenol:monosecondary amine mole:mole:mole ratio of about 1.0:1.0:2.0.

EXAMPLE 5

About 150 g of the stripped EPSA reaction mixture of Example 1 was mixed with 1.24 g of diethanol amine and 0.43 g of p-formaldehyde. The reaction mixture was heated to 80° C. while stirring and nitrogen stripping for 1 hour. At the end of this time, the temperature was raised to 110° C., and the reaction mixture was nitrogen stripped for 1 hour. The product mixture thereby obtained analyzed for 0.15 wt % N. The Mannich Base viscosity index improver/dispersant material was therefore formed employing and EPSA:aminophenol:-monosecondary amine mole:mole: mole ratio of about 1.0:1.0:2.0.

EXAMPLE 6

About 800 g of the stripped EPSA reaction mixture of Example 2 was mixed with 6.9 g of diethanol amine and 2.0 g of p-formaldehyde. The reaction mixture was heated to 80° C. while stirring under a nitrogen blanket for 1 hour. The temperature was then raised to 110° C. and the reaction mixture was nitrogen stripped for 1 hour. The Mannich Base viscosity index improver/dispersant material was therefore formed employing and EPSA:aminophenol:monosecondary amine mole:mole:-mole ratio of about 1.0:1.0:2.0.

EXAMPLES 7-10

A storage stability test was performed in separate runs as follows: A sample of each Mannich Base condensate produced mixture in Examples 3-6 was placed in a closed bottle under air inside an oven at 80° C. The initial viscosity of the sample and the viscosity after 15 days of storage were measured. A product with acceptable storage stability should grow less than 0.02%/hr.

The data thereby obtained are summarized in Table A below.

TABLE A

| Example No. | Initial Viscosity (cp) | Viscosity at 15 days (cp) | % Viscosity Growth per Hour |
|---|---|---|---|
| 7 | 119 | 122 | 0.0070 |
| 8 | 2330 | 3013 | 0.080 |
| 9 | 200 | 221* | 0.0190 |
| 10 | 1309 | 2072 | 0.161 |

*23 days.

The resulting composition is then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test is a used crankcase mineral lubricating oil composition having an original viscosity of about 325 SUS at 38° C. that had been used in a taxicab that is driven generally for short trips only, thereby causing a buildup of a high concentration of sludge precursors. The oil that is used contains only a refined base mineral lubricating oil, a viscosity index improver, a pour point depressant and zinc dialkyldithiophosphate anti-wear additive. The oil contains no sludge dispersant. A quantity of such used oil is acquired by draining and refilling the taxicab crankcase at 1000-2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test is used to determine varnish inhibition. Here, the test sample consists of 10 grams of lubricating oil containing a small amount of the additive being tested. The test oil to which the additive is admixed is of the same type as used in the above-described SIB test. The ten gram sample is heat soaked overnight at about 140° C. and thereafter centrifuged to remove the sludge. The supernatant fluid of the sample is subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air is bubbled through the test sample. During the cooling phase, water vapor is bubbled through the test sample. At the end of the test period, which testing cycle can be repeated as necessary to determine the inhibiting effect of any additive, the wall surfaces of the test flask in which the sample is contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil are mixed with 0.05 grams of the products of the Examples as described in Table II and tested in the aforedescribed SIB and VIB tests.

The Mannich Base condensates thereby obtained were then tested for dispersancy by the above procedure, and the results are summarized in Table B on the next page:

TABLE B

| Sample No. | Sample Prepared in Example No. | Concentration Wt. % Sample in Test Oil | SIB Results (1) | VIB Rating |
|---|---|---|---|---|
| 1 | 3 | 1.0 | 7.53 | 2 |
| 2 | 4 | 1.0 | 5.69 | 2 |
| 3 | 5 | 0.5 | 7.63 | 3 |
| 4 | 5 | 1.0 | 2.90 | 2 |
| 5 | 6 | 1.0 | 3.16 | 2 |

Notes:
(1) Mg sludge/10 g sludge

What is claimed is:

1. A composition useful as a lubricating oil additive which comprises condensation product comprising reaction product of:
   (a) reaction product of oil-soluble ethylene copolymer comprising from about 15 to 90 wt% ethylene and about 10 to 85 wt% of at least one $C_3$ to $C_{28}$ alpha-olefin, said copolymer having a number average molecular weight of from greater than about 10,000 to 500,000, and grafted with an ethylenically unsaturated carboxylic acid material having 1 to 2 dicarboxylic acid groups or anhydride group;
   (b) at least one N-hydroxyaryl amine compound;
   (c) at least one aldehyde reactant; and
   (d) at least one monosecondary amine reactant containing at least one amine of the formula

wherein R and R' are the same or different and are alkyl, cycloalkyl, aryl, alkaryl, aralkyl, and derivatives of the foregoing groups containing one or more tertiary amine groups, wherein R and R' independently contain from 1 to 50 carbon atoms.

2. The lubricating oil additive of claim 1 wherein said copolymer comprises ethylene-propylene copolymer.

3. The lubricating oil additive of claim 1 wherein said copolymer has a number average molecular weight of from about 15,000 to about 250,000.

4. The lubricating oil additive of claim 3 wherein said number average molecular weight is between about 20,000 and 100,000.

5. The lubricating oil additive of claim 1 wherein said copolymer has an ethylene content of between about 30 and about 80 weight percent.

6. The lubricating oil additive of claim 1 wherein said copolymer contains from about 20 to 70 weight percent of said at least one $C_3$ to $C_{28}$ alpha-olefin.

7. The lucbricating oil additive of claim 2 wherein said aldehyde comprises formaldehyde.

8. The lubricating oil additive of claim 2 wherein said number average molecular weight is between about 20,000 and 100,000, and said ethylenically unsaturated acid comprises maleic acid or maleic anhydride.

9. The lubricating oil additive according to claim 1 wherein said monosecondary amine reactant contains from 2 to 60 carbon atoms per molecule.

10. The lubricating oil additive according to claim 9 wherein said monosecondary amine reactant comprises at least one of di($C_1$ to $C_4$ alkanol)amine.

11. The lubricating oil additive according to claim 1 wherein said N-hydroxyaryl amine compound comprises at least one member selected from the group consisting of compounds of the formula:

wherein Ar represents

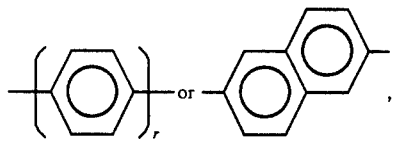

and wherein r is 1 or 2, and derivatives thereof wherein from 1 to 3 ring carbon atoms are each substituted by an alkyl group or halogen atom.

12. The lubricating oil additive according to claim 11 wherein said N-hydroxyaryl amine compound comprises at least one member selected from the group consisting of compounds of the formula:

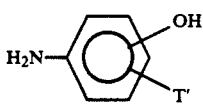

in which T' is hydrogen, alkyl having from 1 to 3 carbon atoms or halogen.

13. The lubricating oil additive according to claim 11 wherein the Ar group is phenyl.

14. The lubricating oil additive of claim 11 wherein said copolymer comprises an ethylene-propylene copolymer.

15. The lubricating oil additive of claim 13 wherein said copolymer comprises an ethylene-propylene copolymer.

16. The lubricating oil additive of claim 15 wherein said copolymer has a number average molecular weight of from about 15,000 to about 250,000.

17. A concentrate containing from about 0.01 to weight percent of the lubricating oil additive of claim 1.

18. A concentrate containing from about 0.05 to weight percent of the lubricating oil additive of claim 2.

19. A lubricating oil composition containing from about 0.1 to 12 weight percent of the lubricating oil additive of any of claims 1 or 2.

20. A lubricating oil composition containing from about 0.1 to 4 weight percent of the lubricating oil additive of claim 13.

21. A lubricating oil additive which comprises a Mannich base condensation product obtained by:
   (i) providing a carbonyl-amino material comprising reaction product of (a) at least one reaction product of oil-soluble ethylene copolymer comprising from about 15 to 90 wt % ethylene and about 10 to 85 wt % of at least one $C_3$ to $C_{28}$ alpha-olefin, said copolymer having a number average molecular weight of from greater than about 10,000 to 500,000, and grafted with an ethylenically unsaturated carboxylic acid material having 1 to 2 dicarboxylic acid groups or anhydride group, and (b) at least one N-hydroxyaryl amine compound, to form said carbonyl-amino material; and
   (ii) contacting said carbonyl-amino material with (c) at least one aldehyde reactant, and (d) at least one monosecondary amine reactant containing at least one amine of the formula

wherein R and R' are the same or different and are alkyl, cycloalkyl, aryl, alkaryl, aralkyl, and derivatives of the foregoing groups containing one or more tertiary amine groups, wherein R and R' independently contain from 1 to 50 carbon atoms, for a time and under conditions sufficient to form said Mannich base condensation product.

22. The lubricating oil additive of claim 21 wherein said copolymer comprises an ethylene-propylene copolymer.

23. The lubricating oil additive of claim 21 wherein said copolymer has a number average molecular weight of from about 15,000 to about 250,000.

24. The lubricating oil additive of claim 23 wherein said number average molecular weight is between about 20,000 and 100,000.

25. The lubricating oil additive of claim 21 wherein said copolymer has an ethylene content of between about 30 and about 80 weight percent.

26. The lubricating oil additive of claim 21 wherein said copolymer contains from about 20 to about 70 weight percent of said at least one $C_3$ to $C_{28}$ alpha-olefin.

27. The lubricating oil additive according to claim 2 wherein said monosecondary amine reactant contains from 2 to 60 carbon atoms per molecule.

28. The lubricating oil additive according to claim 27 wherein said monosecondary amine reactant comprises at least one of di($C_1$ to $C_4$alkanol)amine.

29. The lubricating oil additive according to claim 21 wherein said N-hydroxyaryl amine compound comprises at least one member selected from the group consisting of compounds of the formula:

$N_2N$—Ar—OH wherein Ar represents

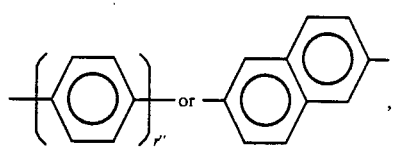

and wherein R" is 1 or 2, and derivatives thereof wherein from 1 to 3 ring carbon atoms are each substituted by an alkyl group or halogen atom.

30. The lubricating oil additive according to claim 29 wherein said N-hydroxyaryl amine compound comprises at least one member selected from the group consisting of compounds of the formula:

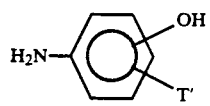

in which T' is hydrogen, alkyl having from 1 to 3 carbon atoms or halogen.

31. The lubricating oil additive according to claim 29 wherein the Ar group is phenyl.

32. The lubricating oil additive according to claim 29 wherein said N-hydroxyaryl amine compound comprises 4-aminophenol.

33. A lubricating oil additive which comprises a Mannich base condensation product obtained by:
   (i) providing N-hydroxyaryl amine-containing Mannich base intermediate obtained by reacting at least one N-hydroxyaryl amine compound, at least one aldehyde reactant and at least one monosecondary amine reactant containing at least one amine of the formula

wherein R and R' are the same or different and are alkyl, cycloalkyl, aryl, alkaryl, aralkyl, and derivatives of the foregoing groups containing one or more tertiary amine groups, wherein R and R' independently contain from 1 to 50 carbon atoms, said N-hydroxyaryl amine-containing Mannich base intermediate containing at least one primary amine group and at least one moiety of the formula

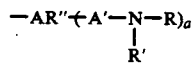

wherein a is an integer of 1 or 2, R and R' are the same or different and are alkyl, cycloalkyl, aryl, alkaryl, aralkyl and hydrocarbyl substituted derivatives thereof, and derivatives of the foregoing groups containing carbon substitution by one or more tertiary amine groups, one or more oxygen, nitrogen, or sulfur atoms, wherein R and R' contain from 1 to 50 carbon atoms, A' comprises the group —CH(T")— wherein T" is H or alkyl of from 1 to 9 carbon atoms and is derived from said aldehyde reactant, and Ar" comprises the moiety of the formula

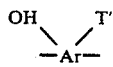

wherein T' is hydrogen, alkyl having from 1 to 3 carbon atoms or halogen and Ar represents

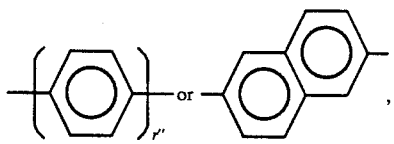

and wherein r" is 1 or 2, and derivatives thereof wherein from 1 to 3 ring carbon atoms are such substituted by a alkyl group or halogen atom; and (ii) contacting said N-hydroxyaryl amine-containing Mannich base intermediate with at least one reaction product of an oil-soluble ethylene copolymer comprising from about 15 to 90 wt % ethylene and about 10 to 85 wt % of at least one $C_3$ to $C_{28}$ alpha-olefin, said copolymer having a number average molecular weight of from greater than about 10,000 to 500,000, and grafted with an ethylenically unsaturated carboxylic acid material having 1 to 2 dicarboxylic acid groups or anhydride groups for a time and under conditions sufficient to form said Mannich base condensation dispersant product.

34. The lubricating oil additive of claim 33 wherein said polymer comprises an ethylene-propylene copolymer.

35. The lubricating oil additive of claim 33 wherein said polymer has a number average molecular weight of from about 15,000 to about 250,000.

36. The lubricating oil additive of claim 35 wherein said number average molecular weight is between about 20,000 and 100,000.

37. The lubricating oil additive of claim 33 wherein said polymer has an ethylene content of between about 30 and about 80 weight percent and contains from about 20 to about 70 weight percent of said at least one $C_3$ to $C_{28}$ alpha-olefin.

38. The lubricating oil additive of claim 34 wherein said aldehyde comprises formaldehyde.

39. The lubricating oil additive according to claim 33 wherein said monosecondary amine reactant contains from 2 to 60 carbon atoms per molecule.

40. The lubricating oil additive according to claim 39 wherein said monosecondary amine reactant comprises at least one of di($C_1$ to $C_4$alkanol)amine.

41. The lubricating oil additive according to claim 33 wherein said N-hydroxyaryl amine compound comprises at least one member selected from the group consisting of compounds of the formula:

$$H_2N—Ar—OH$$

wherein Ar represents

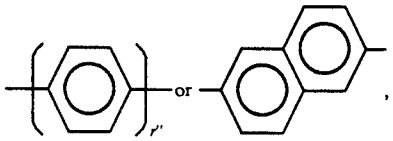

and wherein R" is 1 or 2, and derivatives thereof wherein from 1 to 3 ring carbon atoms are each substituted by an alkyl group or halogen atom.

42. The lubricating oil additive according to claim 33 wherein said N-hydroxyaryl amine compound comprises at least one member selected from the group consisting of compounds of the formula:

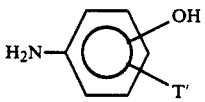

in which T' is hydrogen, alkyl having from 1 to 3 carbon atoms or halogen.

43. The lubricating oil additive according to claim 42 wherein the Ar group is phenyl.

44. The lubricating oil additive according to claim 41 wherein said N-hydroxyaryl amine compound comprises 4-aminophenol.

* * * * *